Patented Oct. 7, 1924.

1,510,606

UNITED STATES PATENT OFFICE.

CECIL OCTAVIOUS PHILLIPS, OF NEW YORK, N. Y., ASSIGNOR TO THE AMERICAN COTTON OIL COMPANY, OF NEW YORK, N. Y., A CORPORATION OF NEW JERSEY.

FOOD PRODUCT.

No Drawing. Application filed November 22, 1921. Serial No. 517,082.

*To all whom it may concern:*

Be it known that I, CECIL O. PHILLIPS, a citizen of the United States, residing at New York city, in the county of New York, State of New York, have invented certain new and useful Improvements in Food Product; and I do hereby declare the following to be a full, clear, and exact description of the invention, such as will enable others skilled in the art to which it appertains to make and use the same.

This invention relates to an improved food product or stock food comprising soya bean meal and calcium chloride intimately combined with each other.

Soya bean meal is largely used as a food, but its use for certain purposes, such as feeding animals, is less advantageous in some respects than cotton seed meal. Soya beans are rich in albuminoids and contain products which are enzymic in character. Certain of the albuminous constituents of the soya bean are liquid in character, or are soluble in water and are dissolved to a greater or less extent in the water present during the milling operations. As a result, the soya bean meal may still contain varying amounts of albuminoids of this character. It is a characteristic of certain of the albuminoids of soya beans that they can be readily coagulated, and the different albuminoids appear to differ in their coagulative properties. Soya bean meal is, moreover, deficient in mineral salts.

According to the present invention, improved food products are obtained by treating the soya bean meal, or the soya beans before or during the production of the meal therefrom, with a solution of calcium chloride, so that the calcium chloride is intimately incorporated or combined with the albuminous and other constituents of the meal.

The invention also includes improvements in methods of producing such a composite food product by acting upon the soya bean meal, or upon the soya beans before or during the production of meal therefrom, with a solution of calcium chloride at an elevated temperature, whereby the albuminous and other constituents of the meal are modified by heating with the calcium chloride solution.

The present invention has the advantage that the milling of the soya beans for the production of oil and meal therefrom need not be modified to any considerable degree, but may even be materially improved. For example, when the soya beans are soaked in water prior to the milling operation, the calcium chloride may be dissolved in the water in which the beans are soaked so that the calcium chloride will be absorbed by or will act upon the beans and so that, during the milling operation, the calcium chloride will be intimately distributed through the beans, and so that the calcium chloride will act upon the constituents of the beans during the cooking operation which follows the grinding of the beans and which precedes the expression of the oil.

Instead of soaking the beans in a calcium chloride solution, the beans may be ground or crushed in the usual way and the ground beans sprayed or otherwise intimately admixed with the calcium chloride solution so that it will be present in an intimate admixture with the beans during the subsequent cooking operation. The calcium chloride solution may even be combined with the meal after the expression of the oil therefrom, for example, by heating the meal with the calcium chloride solution or otherwise bringing about the desired union and combination of the calcium chloride solution with the meal.

When the beans are treated with the calcium chloride solution before the cooking operation, not only will the albuminous and other constituents of the beans be subjected to the action of the calcium chloride, but the production of oil from the cooked beans may be very materially improved and promoted. When the calcium chloride solution is intimately admixed with the ground beans after the cooking operation and before the pressing operation, the calcium chloride will have a similar opportunity to act upon and modify the hot bean constituents during the pressing operation.

The calcium chloride solution can be applied to the soya bean meal, or to the beans before or during the milling operation, by various methods of procedure, certain of which have been mentioned. One advantageous method of doing this is to supply the calcium chloride solution in the form of a mist or spray, by means of suitable atomizing nozzles, into falling streams of the soya bean meal, and then collecting and further mixing the treated meal. The meal can be supplied by means of a conveyer having a perforated bottom through which the meal falls in a series of fine streams, and the calcium chloride solution can be supplied under pressure and in regulated amount to an atomizing nozzle or a series of nozzles so arranged as to give an intimate distribution of the solution through the falling streams of the meal. The meal can then be collected and further mixed in a suitable conveyor, and then conveyed to the place of storage or for further use.

The calcium chloride solution can be made up in the form of a stock solution and supplied in regulated amount to the atomizing nozzles. The solutions can also vary somewhat in their calcium chloride content, and the amount of calcium chloride incorporated with the meal, as well as the amount of water added with the calcium chloride, can be varied and regulated to give a meal of regulated calcium chloride and moisture content. A strong or saturated calcium chloride solution can thus be used, for example, a 30° Bé. or 40° Bé. solution. The amount of the solution incorporated with the meal may, for example, be such as will give about 1% calcium chloride in the final product. For example, a solution of about 32° Bé. can be supplied under a pressure of 25 pounds per square inch to an atomizing nozzle and incorporated with the soya bean meal in the manner above described, in the proportion of about 45 gallons of solution containing about 115 pounds of actual calcium chloride to about 11,200 pounds of meal, so that the resulting meal will contain about 1% of calcium chloride. A larger or smaller amount of calcium chloride can be intimately incorporated with the meal in a similar manner, by regulating the strength of the calcium chloride solution used, as well as the amount of the solution.

The treatment of the meal with the calcium chloride solution can advantageously be carried on as a continuous operation by treating the meal as it flows continuously from the grinder on its way to its place of storage or packaging, and the rate of flow of the meal and the strength and amount of the calcium chloride solution can be suitably regulated by automatic means or otherwise to give a substantially constant and continuous treatment.

The treatment of the soya bean meal in the manner above described results in the production of an improved food product as compared with the untreated meal. The treated meal has an improved feeding value. It can also be regulated as to its moisture content owing to the fact that the calcium chloride imparts to a limited degree a hygroscopic property which can be regulated, for example, by somewhat varying the amount of calcium chloride employed. The calcium chloride also has a preservative action upon the meal, as well as a modifying action upon the albiminous and perhaps other constituents, particularly where the meal or the beans are heated with the calcium chloride solution so that the calcium chloride can exert its coagulating and modifying influence during the cooking or heating operation, and so that the calcium chloride may be even combined in a more intimate state of combination by the heating operation. The deficiency in mineral constituents of the meal will also be supplied to a very considerable degree by the calcium chloride, which is particularly advantageous in this regard.

I claim:

1. A food product comprising soya bean meal intimately combined with calcium chloride.

2. A food product comprising soya bean meal intimately combined with a solution of calcium chloride containing about 1% of calcium chloride based on the total weight of the meal.

3. The method of producing a food product which comprises treating and intimately combining soya bean meal with a solution of calcium chloride.

4. The method of producing a food product which comprises heating soya bean meal in intimate admixture with a solution of calcium chloride.

5. The method of producing a food product which comprises cooking soya beans with a solution of calcium chloride and subsequently expressing the oil from the cooked beans.

6. The method of producing a food product which comprises adding a solution of calcium chloride to heated soya beans and subsequently expressing the oil from the beans.

In testimony whereof I affix my signature.

CECIL OCTAVIOUS PHILLIPS.